United States Patent [19]
O'Brien

[11] Patent Number: 5,026,593
[45] Date of Patent: Jun. 25, 1991

[54] REINFORCED LAMINATED BEAM

[75] Inventor: Michael E. O'Brien, Eugene, Oreg.

[73] Assignee: Elk River Enterprises, Inc., Eugene, Oreg.

[21] Appl. No.: 236,187

[22] Filed: Aug. 25, 1988

[51] Int. Cl.5 .................... B32B 15/10; E04B 1/82; C09J 4/00
[52] U.S. Cl. .................... 428/215; 428/114; 428/464; 428/537.1; 156/331.4; 156/331.7
[58] Field of Search ............ 428/215, 464, 537.1, 428/114

[56] References Cited

U.S. PATENT DOCUMENTS

| | | | |
|---|---|---|---|
| 138,646 | 5/1873 | Gwynn | 428/464 |
| 441,036 | 11/1890 | Siebel | 428/464 X |
| 3,110,643 | 11/1963 | Downing | 428/464 |

FOREIGN PATENT DOCUMENTS

| | | | |
|---|---|---|---|
| 1271970 | 7/1968 | Fed. Rep. of Germany | 428/464 |
| 2935093A1 | 3/1981 | Fed. Rep. of Germany | 428/464 |

*Primary Examiner*—P. C. Sluby
*Attorney, Agent, or Firm*—John F. Ingman

[57] ABSTRACT

A reinforced laminated beam provides reinforcement in the locations where maximum tension occurs on such beams, generally at the lower portions of the beam, by the addition of a layer of high tensile strength material between successive layers or laminations of wood. A thin layer of high tensile strength material, preferably a strip of aluminum alloy with a tensile yield strength of approximately 41,000 psi and a thickness of 0.064-inch, which is continuous across the width and length of the beam, is adhesively fixed between the bottom two laminations of wood, thereby producing a significant increase in the carrying capacity of the beam, while providing no obstacle to the sawing or other working of the beam in the field. Reinforcing material also may be added between other lower laminations for additional reinforcement, this being particularly useful for deep beams having a large number of laminations. The carrying capacity of a beam may be still further strengthened by the addition of a reinforcing strip between the two upper laminations in a beam, such upper reinforcing layer being useful where, because of the increase in the tensile strength at the lower laminations, the weaker area in the beam now has become the compressive strength of the upper laminations.

4 Claims, 1 Drawing Sheet

REINFORCED LAMINATED BEAM

BACKGROUND OF THE INVENTION

1. Field of the Invention

This invention involves a reinforced laminated beam, and, more particularly, a glued laminated wood beam wherein high strength reinforcing material in continuous form is adhesively positioned between laminations in locations of high stress.

2. Description of the Prior Art

The glued laminated wood beam has a number of properties which make it superior for structural applications:

a. Such beams are reliable, dimensionally stable and long-lasting b. They are economical, usually being lower in cost than steel, have a high strength-to-weight ratio and are easy to modify on-site.

c. They are safe, in that such beams burn slowly and resist heat penetration by the formation of char, allowing the uncharred inner portion to maintain its strength; and do not deform significantly in a fire. Furthermore, they can absorb shocks that would rupture or break other materials, thus providing safety under high wind and earthquake conditions.

d. They offer the natural beauty of wood.

There is a need, however, to improve the tensile strength of glued laminated wood beams without affecting the advantages in their use, particularly the flexibility of on-site modification. The maximum tension, in the normal beam application, occurs along the lower laminations of the beam, thus establishing the carrying capacity of the conventionally constructed beam.

An increase in beam strength, particularly at the lower laminations, would permit greater loads to be placed on the beams, or in the alternative, would allow a smaller beam to carry the same load. The latter provides architectural advantages by permitting a shallower beam in designs where beam space is at a premium.

SUMMARY OF THE INVENTION

The present invention provides a reinforced glued laminated beam designed to satisfy the aforementioned need. The invention provides reinforcement in the locations where maximum tension occurs on such beams, generally at the lower portions of the beam in the normal beam application, by the addition of a layer of high tensile strength material between successive layers or laminations of wood.

Accordingly, to increase tensile strength at the lower portion of a glued laminated wood beam, a thin layer of high tensile strength material, continuous across the width and length of the beam, is adhesively fixed between the bottom two laminations of wood, which addition results in a significant increase in carrying capacity of the beam. In the preferred embodiment, in order to compliment the inherent advantages of the glued laminated wood beam, a reinforcing strip of aluminum alloy with a tensile yield strength of approximately 41,000 psi and a thickness of 0.064-inch is used. Such strip provides no obstacle to the sawing or other working of the beam in the field, but produces a significant increase in the carrying capacity of the beam. The addition of the thin reinforcing strip is consistant with the size criteria for manufactured beams so that its inclusion does not make the beam oversize, so as to not require a corresponding reduction in thickness of the conventional wood elements of the beam. The aluminum alloy material has affinity to currently available adhesives to permit joining to the adjacent layers of wood.

In addition, or as an alternative, to placement of a strip of high tensile strength material between the bottom two laminations of wood, other configurations and placements of continuous high tensile strength reinforcing materials in beam high stress areas may be made. Reinforcing material may be added between other lower laminations for additional reinforcement, this being particularly useful for deep beams having a large number of laminations. The carrying capacity of a beam may be still further strengthened by the addition of a reinforcing strip between the two upper laminations in a beam, such upper reinforcing layer being useful where, because of the increase in the tensile strength at the lower laminations, the weaker area in the beam now has become the compressive strength of he upper laminations.

DESCRIPTION OF THE PREFERRED EMBODIMENT

Figure 1:
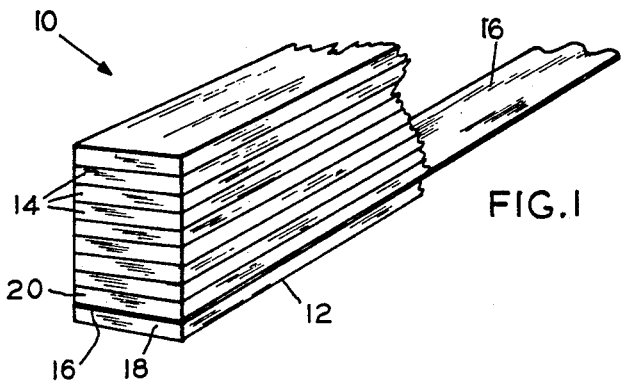
FIG 1 provides an end perspective view of a laminated beam having a flat reinforcing strip inserted between the two lower laminations.
Figure 2:
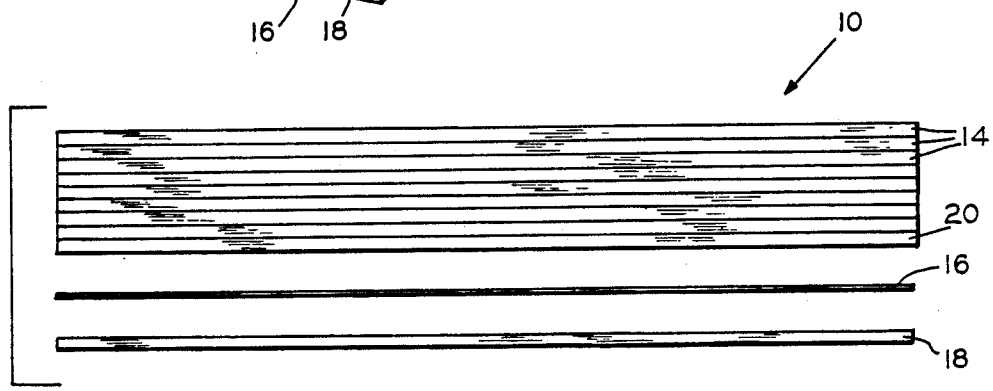
FIG. 2 provides an exploded side view of the laminated beam with a flat reinforcing strip inserted between the two lower laminations.

Referring now to the drawings, FIG. 1 and FIG. 2 illustrate a preferred embodiment of the reinforced laminated beam 10. A typical glued, laminated wood beam 12, here illustrated as having ten (10) horizontally layered laminations 14, is shown wherein a thin flat strip 16 of high tensile strength material is adhesively fixed between the two lowermost laminations 18 and 20. The strip 16 is continuous across the length and width of the adjacent laminations 18 and 20, and thus extends for the entire length and width of the beam 10. The reinforcing strip material requires a high strength per unit size; an ability to be cut with regular saws and worked with regular tools available at a construction site, so as to permit necessary field modifications or adjustments; and characteristics which permit ease and economy in fabrication. A preferred material for the reinforcing strip 16 is H 38 tempered aluminum alloy 5052, which has tensile yield strength in excess of 41,000 psi, in a thickness 0.064 inches. This aluminum alloy is commercially available in continuous rolls which aid in the fabrication of the reinforced laminated beam 10. In addition to commercial availability, the tensile strength of the reinforcing strip 16 must be compatible with the strength of available adhesive used to bond the strip 16 between the adjacent laminations 18 and 20. Exceeding the shear strength of the adhesive should be avoided; thus with an adhesive having a shear strength of 1,350 to 1,400 pounds per linear inch of width of the beam 10, so that the total shear strength bonding the reinforcing strip 16 on both sides to laminations 18 and 20 is approximately 2,700 to 2,800 pounds per linear inch of width of the beam 10, a reinforcing strip having a tensile yield strength of approximately 2,624 pounds per linear inch of width (41,000 psi×0.064 inches) is appropriate (A strip thickness of 0.10 inch was found to produce glue line failure with the aluminum alloy strip 16, not having reached its tensile yield, remaining totally intact.)

The application of the thin continuous strip 16 of reinforcing material compliments the configuration of currently manufactured beams in that it does not make the beam oversize, thereby not requiring a corresponding reduction in thickness of the conventional wood elements of the beam 10. The additional beam thickness caused by the addition of strip 16 readily fits within allowed oversize criteria.

Other high tensile strength materials, which are easily cut and worked in the field, may also be suitable as the reinforcing strip 16, in the same manner as the preferred aluminum alloy.

The preferred reinforced laminated beam 10, as described above, may readily be fabricated. The aluminum alloy must be prepared to permit an adhesive bond, due to the pervasive oxidation associated with aluminum. Normally such preparation is a two stage process, the first step being a cleaning stage where the aluminum alloy is washed, then bathed in a light acid for oxidation removal and etching, and then washed clean. The second stage is the application of the primer, preferably an alodine coating, onto the chemically cleaned surface. (An alternative may be the purchase of aluminum alloy which is precoated with a alodine coating.)

The selection of the appropriate adhesive which bonds metal to wood is necessary. Preferred is an emulsion polymer isocyanate, such as manufactured by Ashland Chemical Company of Columbus, Ohio, in binary form, as ISOSET WD-A320 Resin and ISOSET CX-11 Crosslinker. Such adhesive is an approved structural adhesive.

The actual gluing of the laminated beam can follow either of two procedures, i.e. (1) gluing a billet, consisting of the lower two wood laminates 18 and 20 with the aluminum alloy strip 16 fixed between them, using the ISOSET adhesive previously noted, and then completing the assembly of the laminated beam 10 wood-to-wood lamination 14 construction using less expensive glue such as Bordens' LT-75 recorsinal resin with FM260 para-formaldehyde catalyst; or, (2) laying up the whole beam, using the ISOSET adhesive for wood-to-wood bonding as well as for the metal-to-wood bonding. The former production procedure is currently preferred due to the additional cost of using the more expensive ISOSET adhesive between all laminations.

The laminated beam is then clamped together, using conventional clamping means with 125 psi surface pressure until the adhesive is properly cured.

Comparison of the results of the addition of the 0.064 inch strip 16 of reinforcing H 38 tempered aluminum alloy 5052 to a glued laminated wood beam 12 reveals a significant increase in carrying capacity. An unreinforced conventionally constructed glued horizontally laminated wood beam, not shown, consisting of ten (10) layers or laminates of Douglas Fir, and having a width of 3⅛ inches, a height of 15 inches, and a length of 12 feet is found to have a total carrying capacity of 1,460 lbs. per linear foot. However, when reinforced by the addition of the preferred 0.064 inch thick flat continuous strip 16 of H 38 tempered aluminum alloy 5052, applied as illustrated in FIG. 1 and FIG. 2 and described above, the reinforced beam now has a carrying capacity of 1,995 lbs. per linear foot. Thus by adding the strip 16 of preferred reinforcing material between the two lower most laminations 18 and 20 of the glued laminated wood beam 12, the carrying capacity per linear foot has been increased by 535 lbs. or 37%.

The reinforced beam 10 retains the properties which make the laminated wood beam superior while increasing its carrying capacity. Thus, greater loads may be permitted on the same size beam, or in the alternative, a smaller reinforced beam may be used to carry the same load as a non-reinforced beam, thereby providing architectural advantages where beam space is at a premium.

Figure 3:
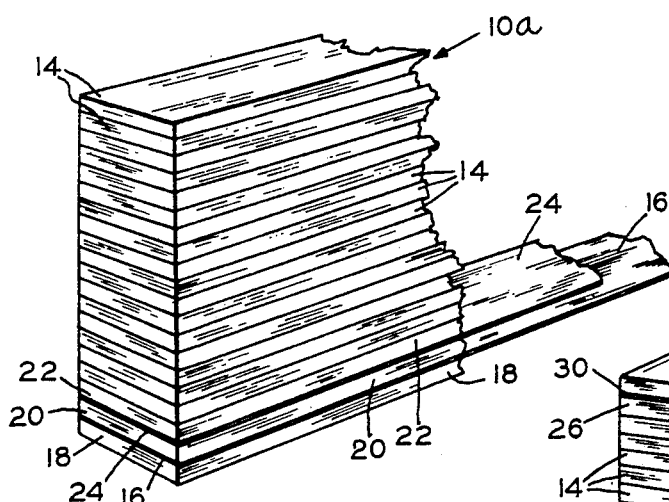
FIG. 3 provides an end perspective view of a laminated beam having a flat reinforcing strip inserted between the lower two laminations and a second flat reinforcing strip inserted between the second and third lower laminations.

In a glued laminated wood beam having eight (8) to approximately sixteen (16) laminations, the lower two (2) laminations are in tension when the beam is loaded. For an additional eight (8) to sixteen (16) laminations, the third lamination 22 from the bottom also comes under tension. Therefore, for deeper beams, e.g. 16 to 32 laminations, it becomes desirable also to reinforce the tensile stress in the third lamination 22 from the bottom of the beam 10 by fixing an additional reinforcing metal strip 24 between the second and third laminations 20 and 22. Such application of a second lower reinforcing strip 24 is seen in beam 10a at FIG. 3.

Figure 4:
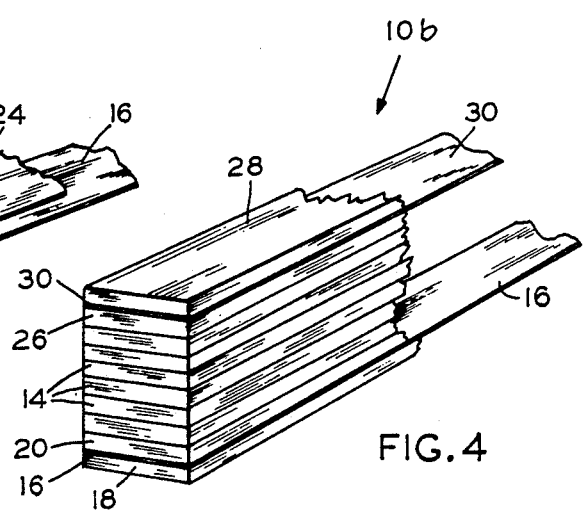
FIG. 4 provides an end perspective view of a laminated beam having flat reinforcing strips installed between both the lower two laminations and the upper two laminations.

As described above, the addition of the reinforcing strip 16 between the lowermost laminations 18 and 20 strengthens the lower laminations 18 and 20 against tension bending failures, such mode of failures being the limit of carrying capacity of the beam 10. With the lower laminations 18 and 20 thus reinforced, the mode of failure of a glued laminated wood beam 10b, as shown in FIG. 4, is shifted to compression failure at the uppermost laminations 26 and 28 of the beam 10b. Such compression failure in the uppermost laminations 26 and 28 can be alleviated by the inclusion of a reinforcing strip 30, adhesively fixed between the uppermost two laminations 26 and 28 of the beam 10b. In such instance, the compressive strength, rather than the tensile strength, of the reinforcing strip 28 is relied upon to strengthen the beam 10b, and thus increase the carrying capacity still further.

It is thought that the reinforced laminated beam of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A reinforced laminated wood beam, comprising:
   a. an elongated bottom layer of wood, formed to be supported at its ends, when said beam is placed under a downward load, results in a lengthwise tensile stress in said bottom layer of wood, said bottom layer of wood having a first tensile strength;
   b. an elongated reinforcing member adhesively bonded atop said bottom layer of wood, which, when said beam is placed under the downward load, results in a lengthwise tensile stress in said reinforcing member, said reinforcing member having a second tensile strength greater then said first tensile strength;
c. a second elongated layer of wood adhesively bonded atop said reinforcing member, which when said beam is placed under the downward load, results in a lengthwise tensile stress in said second layer of wood, said second layer of wood having a third tensile strength substantially the same as said first tensile strength;
d. at least one additional elongated layer of wood adhesively bonded atop said second layer of wood;
e. said reinforcing member including a continuous flat strip of aluminum alloy which extends the length and width of the two adjacent layers of wood;
f. wherein a load-bearing, horizontally layered, laminated wood beam is formed having a reinforcing member adhesively positioned between the two lower most layers of wood.

2. The reinforced laminated wood beam, as recited in claim 1, wherein the continuous flat strip of aluminum alloy is approximately 0.064-inches in thickness.

3. A reinforced laminated wood beam, comprising:
a. an elongated bottom layer of wood, formed to be supported at its ends, which, when said beam is placed under a downward load, results in a lengthwise tensile stress in said bottom layer of wood, said bottom layer of wood having a first tensile strength;
b. an elongated reinforcing member adhesively bonded atop said bottom layer of wood, which, when said beam is placed under the downward load, results in a lengthwise tensile stress in said reinforcing member, said reinforcing member having a second tensile strength greater than said first tensile strength;
c. a second elongated layer of wood adhesively bonded atop said reinforcing member, when said beam is placed under the downward load, results in a lengthwise tensile stress in said second layer of wood, said second layer of wood having a third tensile strength substantially the same as said first tensile strength;
d. a second elongated reinforcing member adhesively bonded atop said second layer of wood, which, when said beam is placed under the downward load, results in a lengthwise tensile stress in said second reinforcing member, said second reinforcing member having a fourth tensile strength substantially the same as said second tensile strength;
e. a third elongated layer of wood adhesively bonded atop said second reinforcing member, which when said beam is placed under the downward load, results in a lengthwise tensile stress in said third layer of wood, said third layer of wood having a fifth tensile strength substantially the same as said first and third tensile strengths;
f. at least one additional elongated layer of wood adhesively bonded atop said third layer of wood;
g. said first and second reinforcing members each including a continuous flat strip of aluminum alloy which extends the length and width of two adjacent layers of wood;
h. wherein a load-bearing, horizontally layered, laminated wood beam is formed having two reinforcing members, with one reinforcing member adhesively positioned between the lowermost and second lowermost layers of wood and a second reinforcing member adhesively positioned between the second lowermost and third lowermost layers of wood of the beam.

4. The reinforced laminated wood beam, as recited in claim 3, wherein the continuous flat strip of aluminum alloy of both the first and second reinforcing members is approximately 0.064-inches in thickness.

* * * * *